US012484097B2

(12) United States Patent
Suo

(10) Patent No.: US 12,484,097 B2
(45) Date of Patent: Nov. 25, 2025

(54) METHOD FOR MONITORING LINK AND TERMINAL DEVICE

(71) Applicant: Honor Device Co., Ltd., Guangdong (CN)

(72) Inventor: Yayun Suo, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/255,419

(22) PCT Filed: Sep. 16, 2022

(86) PCT No.: PCT/CN2022/119259
§ 371 (c)(1),
(2) Date: Jun. 1, 2023

(87) PCT Pub. No.: WO2023/061146
PCT Pub. Date: Apr. 20, 2023

(65) Prior Publication Data
US 2024/0073978 A1    Feb. 29, 2024

(30) Foreign Application Priority Data
Oct. 13, 2021  (CN) .......................... 202111190173.0

(51) Int. Cl.
*H04W 76/15* (2018.01)
*H04W 76/14* (2018.01)
*H04W 84/20* (2009.01)

(52) U.S. Cl.
CPC ............ *H04W 76/14* (2018.02); *H04W 84/20* (2013.01)

(58) Field of Classification Search
CPC ......... H04W 56/0015; H04W 72/1215; H04W 88/06; H04W 76/14; H04W 4/80;
(Continued)

(56) References Cited

U.S. PATENT DOCUMENTS 9,002,282 B1 * 4/2015 de la Broise ......... H04W 88/06
455/553.1
11,013,062 B2   5/2021 Srivastava et al.
(Continued)

FOREIGN PATENT DOCUMENTS

CN    106452512 A    2/2017
CN    108901077 A    11/2018
(Continued)

*Primary Examiner* — Cindy Trandai
(74) *Attorney, Agent, or Firm* — Rimon PC

(57) ABSTRACT

This application provides a method for monitoring a link and a terminal device, so as to increase a data transmission rate of a Wi-Fi service and/or Bluetooth service in a Wi-Fi and Bluetooth coexistence scenario with the same operating band. The method is applied to a first terminal device, and includes: establishing a Bluetooth ACL between the first terminal device and a second terminal device; determining a preset parameter of the first terminal device and/or the second terminal device; determining, based on the preset parameter, whether to perform role switch; sending a first request message to the second terminal device when it is determined to perform role switch, where the first request message is used to request role switch between the first terminal device and the second terminal device.

12 Claims, 9 Drawing Sheets

(58) Field of Classification Search
CPC ..... H04W 84/12; H04W 76/15; H04W 84/20; H04W 52/00; H04W 92/18; Y02D 30/70
See application file for complete search history.

(56) References Cited

U.S. PATENT DOCUMENTS

| | | | |
|---|---|---|---|
| 11,751,283 B2 | 9/2023 | Xu et al. | |
| 2007/0232358 A1* | 10/2007 | Sherman | H04W 88/06 455/560 |
| 2007/0268875 A1 | 11/2007 | Lee et al. | |
| 2012/0207101 A1* | 8/2012 | Chang | H04W 72/1215 370/329 |
| 2013/0260687 A1* | 10/2013 | Paycher | H04W 56/0015 455/553.1 |
| 2013/0322315 A1* | 12/2013 | Wasily | H04M 1/72412 370/311 |
| 2015/0341869 A1* | 11/2015 | Sen | H04W 52/346 455/522 |
| 2017/0111918 A1* | 4/2017 | Jechoux | H04W 72/1215 |
| 2020/0044769 A1* | 2/2020 | Neelisetty | H04W 4/80 |
| 2020/0128617 A1 | 4/2020 | Xian et al. | |
| 2020/0252993 A1 | 8/2020 | Srivastava et al. | |
| 2020/0374820 A1* | 11/2020 | Srivastava | H04L 5/0055 |
| 2021/0219360 A1* | 7/2021 | Ferrari | H04R 25/554 |

FOREIGN PATENT DOCUMENTS

| | | |
|---|---|---|
| CN | 111107526 A | 5/2020 |
| CN | 111132110 A | 5/2020 |
| CN | 113348675 A | 9/2021 |
| CN | 113645715 A | 11/2021 |
| CN | 114466099 A | 5/2022 |
| KR | 20020022274 A | 3/2002 |

* cited by examiner

METHOD FOR MONITORING LINK AND TERMINAL DEVICE

CROSS-REFERENCE TO RELATED APPLICATIONS

This application is a national stage of International Application No. PCT/CN2022/119259, filed on Sep. 16, 2022, which claims priority to Chinese Patent Application No. 202111190173.0, filed on Oct. 13, 2021. The disclosures of both of the aforementioned applications are hereby incorporated by reference in their entireties.

TECHNICAL FIELD

This application relates to the field of communication, and in particular, to a method for monitoring a link and a terminal device.

BACKGROUND

With continuous development of terminal devices, many terminal devices support wireless fidelity (wireless fidelity, Wi-Fi) functions and Bluetooth functions. Both Wi-Fi and Bluetooth may operate on a 2.4 GHz band. For example, when Wi-Fi operates on the 2.4 GHz band, the band for Wi-Fi is from 2412 MHz to 2484 MHz. When Bluetooth operates on the 2.4 GHz band, the band for Bluetooth is from 2401 MHz to 2479 MHz. Due to limitations on hardware and costs of a terminal device, Wi-Fi and Bluetooth are required to operate at the same time in many scenarios. Because Wi-Fi and Bluetooth share air interface resources when operating on the same band, Wi-Fi and Bluetooth will inevitably interfere with each other more or less when operating at the same time.

That the terminal device is a mobile phone is used as an example. When the mobile phone downloads an application over Wi-Fi, a Bluetooth headset actively initiates a Bluetooth connection to the mobile phone to establish an asynchronous connectionless link (asynchronous connectionless link, ACL) with the mobile phone. After the Bluetooth connection is established, the Bluetooth headset listens to music on the mobile phone through the Bluetooth ACL. In this case, the Bluetooth headset that actively initiates the Bluetooth connection is a master (master), and the mobile phone is a slave (slave). However, the mobile phone acting as the slave needs to continuously monitor the Bluetooth ACL to synchronize a message sent by the Bluetooth headset acting as the master, so as to increase a Bluetooth time-sharing ratio per unit time of the mobile phone. Because Wi-Fi and Bluetooth of the mobile phone share limited air interface resources, air interface resources of Wi-Fi may be occupied by the mobile phone with a higher Bluetooth time-sharing ratio, resulting in network stalling and a slow download speed of an application.

SUMMARY

An embodiment of this application provides a method for monitoring a link and a terminal device, so as to increase a data transmission rate of a Wi-Fi service and/or Bluetooth service in a Wi-Fi and Bluetooth coexistence scenario.

According to a first aspect, this application provides a method for monitoring a link, applied to a first terminal device. The method includes: establishing a Bluetooth ACL between the first terminal device and a second terminal device, where the first terminal device is a slave and the second terminal device is a master, and the first terminal device has established a Wi-Fi link; determining a preset parameter of the first terminal device and/or the second terminal device; determining, based on the preset parameter, whether to perform role switch; sending, by the first terminal device, a first request message to the second terminal device when it is determined to perform role switch, where the first request message is used to request role switch between the first terminal device and the second terminal device, and a Bluetooth time-sharing ratio of the master per unit time is lower than that of the slave per unit time; receiving, by the first terminal device, a first response message from the second terminal device, where the first response message is used to confirm or reject the role switch with the first terminal device; and when it is determined to perform the role switch, monitoring, by the first terminal device, the Bluetooth ACL based on a first Bluetooth time-sharing ratio, where the first Bluetooth time-sharing ratio is lower than a second Bluetooth time-sharing ratio used by the first terminal device to monitor the Bluetooth ACL before the role switch.

In this application, in a scenario in which the first terminal device acting as a slave transmits Bluetooth data with the second terminal device, and the first terminal device acting as a master is transmitting Wi-Fi data with another terminal device, the first terminal device may send a first request message for role switch to the second terminal device, to request the first terminal device to act as a master and the second terminal device to act as a slave. In this way, when it is determined to perform the role switch, the first terminal device acting as the master may reduce a Bluetooth time-sharing ratio, and reduce occupation of a Wi-Fi time-sharing ratio, so as to increase a data transmission rate of an ongoing Wi-Fi service.

In addition, the first terminal device may determine, based on the preset parameter, whether to perform the role switch, and when it is determined to perform the role switch, the first terminal device sends a message requesting the role switch to the second terminal device, so as to implement the role switch. When it is determined that the role switch does not need to be performed, the first terminal device does not send the message requesting the role switch, so as to reduce signaling overheads.

With reference to the first aspect, in some implementations of the first aspect, the preset parameter includes at least one of the following: Wi-Fi data transmission flow and/or Bluetooth data transmission flow of the first terminal device; or a power consumption increment of the first terminal device acting as a slave; or an electricity quantity of the first terminal device; or an electricity quantity of the second terminal device; or a capability of the second terminal device acting as a slave; or a performance reduction of the second terminal device acting as a slave.

In this application, the first terminal device may consider preset parameters related to both the first terminal device and the second terminal device to determine whether to perform role switch, so as to implement the role switch.

With reference to the first aspect, in some implementations of the first aspect, the determining, by the first terminal device based on the preset parameter, whether to perform role switch includes: determining, by the first terminal device, whether the second terminal device has the capability to act as a slave, whether the electricity quantity of the second terminal device is greater than or equal to a first preset threshold, and whether the performance reduction of the second terminal device acting as a slave is less than or equal to a second preset threshold when at least one of the following conditions is met: the Wi-Fi data transmission flow and/or Bluetooth data transmission flow of the first terminal device is higher than or equal to a third preset threshold, the power consumption increment of the first terminal device acting as a slave is greater than or equal to a fourth preset threshold, or the electricity quantity of the first terminal device is less than or equal to a fifth preset threshold; and determining, by the first terminal device, to perform the role switch when the second terminal device has the capability to act as a slave, the electricity quantity of the second terminal device is greater than or equal to the first preset threshold, and the performance reduction of the second terminal device acting as a slave is less than or equal to the second preset threshold.

In this application, because the first terminal device expects to perform role switch, the first terminal device first considers the preset conditions of the first terminal device; when at least one of the preset conditions of the first terminal device is met, the first terminal device considers the preset conditions of the second terminal device; and when a second preset condition is met, the first terminal device determines to perform the role switch.

With reference to the first aspect, in some implementations of the first aspect, the first request message includes a first time point. The monitoring, by the first terminal device, the Bluetooth ACL based on a first Bluetooth time-sharing ratio includes: monitoring, by the first terminal device, the Bluetooth ACL based on the first Bluetooth time-sharing ratio at the first time point.

In this application, the first terminal device may perform the role switch based on the first time point selected by the first terminal device, and the first time point may be a time point at which the first terminal device does not transmit data, so as to implement the role switch.

With reference to the first aspect, in some implementations of the first aspect, the first response message includes a second time point, and the second time point is determined by the second terminal device. The monitoring, by the first terminal device, the Bluetooth ACL based on a first Bluetooth time-sharing ratio includes: monitoring, by the first terminal device, the Bluetooth ACL based on the first Bluetooth time-sharing ratio at the second time point. In this application, the second terminal device finds, based on judgment, that the second terminal device may transmit data to the first terminal device over the Bluetooth ACL at the first time point, and therefore the second terminal device may select a second time point to avoid data transmission, and send the second time point carried in the first response message to the first terminal device, so as to avoid impact on data transmission between the first terminal device and the second terminal device.

With reference to the first aspect, in some implementations of the first aspect, the determining, by the first terminal device based on the preset parameter, whether to perform role switch includes: determining, by the first terminal device, not to perform role switch when the following conditions are met: the Wi-Fi data transmission flow and/or Bluetooth data transmission flow of the first terminal device is lower than or equal to the third preset threshold, the power consumption increment of the first terminal device acting as a slave is less than or equal to the fourth preset threshold, and the electricity quantity of the first terminal device is greater than or equal to the fifth preset threshold.

In this application, if the Wi-Fi data transmission flow and/or Bluetooth data transmission flow of the first terminal device is less than or equal to the third preset threshold, continuous monitoring of the Bluetooth ACL by the first terminal device may have less impact on data transmission of an ongoing Wi-Fi service and/or Bluetooth service. If the power consumption increment of the first terminal device acting as a slave is less than or equal to the fourth preset threshold, continuous monitoring of the Bluetooth ACL by the first terminal device may have less impact on power consumption of the first terminal device. If the electricity quantity of the first terminal device is greater than or equal to the fifth preset threshold, a reduction in the electricity quantity resulting from continuous monitoring of the Bluetooth ACL by the first terminal device has less impact on normal use of the first terminal device. Therefore, the first terminal device may not perform the role switch when the three conditions are met.

With reference to the first aspect, in some implementations of the first aspect, the determining, by the first terminal device based on the preset parameter, whether to perform role switch includes: determining, by the first terminal device, not to perform role switch when at least one of the following conditions is met: the second terminal device does not have the capability to act as a slave, the electricity quantity of the second terminal device is less than or equal to the first preset threshold, or the performance reduction of the second terminal device acting as a slave is greater than or equal to the second preset threshold.

In this application, if the first terminal device does not have the capability to act as a slave and cannot perform role switch, or if the electricity quantity of the second terminal device is less than or equal to the first preset threshold, normal communication of the second terminal device may be affected due to excessive reduction in the electricity quantity resulting from frequent monitoring of a Bluetooth ACL channel by the first terminal device acting as a slave; or the performance reduction of the second terminal device acting as a slave is greater than or equal to the second preset threshold, this may also affect the normal communication of the second terminal device. Therefore, when the second terminal device meets at least one of the foregoing conditions, the first terminal device may determine not to perform the role switch.

With reference to the first aspect, in some implementations of the first aspect, the determining, by the first terminal device, a preset parameter of the first terminal device and/or the second terminal device includes: obtaining historical switch information of the first terminal device and the second terminal device; and determining a preset parameter of the first terminal device and/or the second terminal device from the historical switch information.

In this application, the first terminal device stores the historical switch information from previous communication with the second terminal device. For example, the first terminal device may store a blacklist, and the blacklist is used to indicate the second terminal device that refuses to act as a slave, does not support the capability of role switch, or supports the capability of role switch, but has lower performance after the role switch. For another example, the first terminal device may store a whitelist, and the whitelist is used to indicate the second terminal device that supports the capability of role switch and whose performance is less impacted after the role switch.

With reference to the first aspect, in some implementations of the first aspect, before the determining, based on the preset parameter, whether to perform role switch, the first terminal device determines whether the first terminal device is in a Wi-Fi and Bluetooth coexistence scenario. The determining, based on the preset parameter, whether to perform role switch includes: when the first terminal device is in a Wi-Fi and Bluetooth coexistence scenario, determining, by the first terminal device based on the preset parameter, whether to perform role switch.

In this application, when the first terminal device is in a Wi-Fi and Bluetooth coexistence scenario, the first terminal device may monitor the Bluetooth ACL at a high Bluetooth time-sharing ratio, which may affect user experience of an ongoing Wi-Fi service, such as slow application download and slow file transfer.

With reference to the first aspect, in some implementations of the first aspect, the establishing a Bluetooth ACL between the first terminal device and the second terminal device includes: receiving, by the first terminal device, a Bluetooth ACL establishment request message from the second terminal device; and sending a Bluetooth ACL establishment response message to the second terminal device based on the Bluetooth ACL establishment request message, where the Bluetooth ACL establishment response message is used to confirm the establishment of the Bluetooth ACL with the second terminal device.

In this application, the first terminal device may receive a Bluetooth ACL establishment request actively initiated by the second terminal device; and after the Bluetooth ACL is successfully established, the first terminal device is a slave, and the second terminal device is a master.

According to a second aspect, this application provides a terminal device, configured to perform the method according to any one of the possible implementations of the first aspect. Specifically, the terminal device includes a module configured to perform the method according to any one of the possible implementations of the first aspect.

According to a third aspect, this application provides a terminal device, including a processor. The processor is coupled to a memory, and may be configured to execute instructions in the memory to perform the method according to any one of the possible implementations of the first aspect. Optionally, the terminal device further includes a memory. Optionally, the terminal device further includes a communication interface, and the processor is coupled to the communication interface.

According to a fourth aspect, this application provides a processor, including an input circuit, an output circuit, and a processing circuit. The processing circuit is configured to receive a signal through the input circuit and transmit a signal through the output circuit, so that the processor is enabled to perform the method according to any one of the possible implementations of the first aspect.

In a specific implementation process, the processor may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. Further, the input circuit and the output circuit may be a same circuit, and the circuit is separately used as the input circuit and the output circuit at different moments. Specific implementations of the processor and various circuits are not limited in embodiments of this application.

According to a fifth aspect, this application provides a processing apparatus, including a processor and a memory. The processor is configured to read instructions stored in the memory, and can receive a signal through the receiver and transmit a signal through the transmitter to perform the method according to any one of the possible implementations of the first aspect.

Optionally, there are one or more processors, and there are one or more memories.

Optionally, the memory may be integrated with the processor, or may be disposed separately from the processor.

In a specific implementation process, the memory may be a non-transitory (non-transitory) memory, such as a read-only memory (read-only memory, ROM). The memory and the processor may be integrated on one same chip, or may be separately disposed on different chips. A type of the memory and disposing manners of the memory and the processor are not limited in this application.

It should be understood that there are related data interaction processes, for example, sending indication information may be a process of outputting the indication information from the processor, and receiving capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus according to the fifth aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory, where the memory may be integrated into the processor, or may be located outside the processor and exist independently.

According to a sixth aspect, this application provides a computer program product. The computer program product includes a computer program (which may also be referred to as code or instructions), and the computer program, when run, enables a computer to perform the method according to any one of the possible implementations of the first aspect.

According to a seventh aspect, this application provides a computer-readable storage medium. The computer-readable storage medium stores a computer program (which may also be referred to as code or instructions), and the computer program, when run on a computer, enables the computer to perform the method according to any one of the possible implementations of the first aspect.

DESCRIPTION OF EMBODIMENTS

The following describes technical solutions in this application with reference to accompanying drawings.

For ease of understanding, the following first describes role switch (role switch) used in embodiments of this application.

Generally, in Bluetooth communication, a paging device is always a master in a network, and sometimes it is necessary to switch master and slave roles. Assuming that a device A and a device B communicate over a Bluetooth ACL in the same piconet, with the device A acting as a master and the device B acting as a slave. To perform role switch, the device A and the device B need to use the same frequency modulation scheme (a Bluetooth device address and a clock of the device A are still used) to perform time division dual (time division dual, TDD) switch. Therefore, there is no piconet switch, and slot offset information sent by the device B has not been used. When the device A and the device B are switched to a new piconet, the slot offset information is used, and the device A may locate a related window. After the role switch, the device B becomes a master, the device A becomes a slave, and the device A may use a logical transfer address (LT-ADDR) previously used by the device B acting as the slave.

Figure 1:
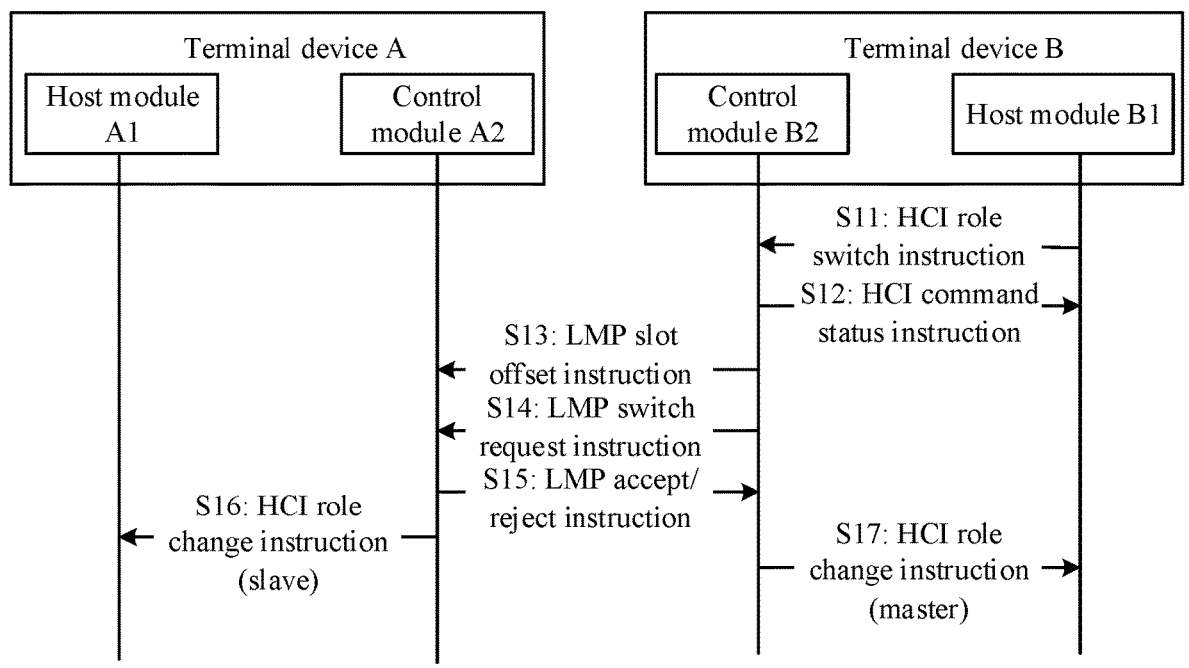
FIG. 1 is a schematic flowchart of a method for role switch between terminal devices.

FIG. 1 is a schematic flowchart of a method 10 for role switch between terminal devices. As shown in FIG. 1, a terminal device A includes a host module A1 and a control module A2, and a terminal device B includes a host module B1 and a control module B2. The terminal device A is a master, the terminal device B is a slave, and the terminal device B acting as the slave may actively initiate role switch. The method 10 includes the following steps:

S11: The host module B1 sends a host controller interface (host controller interface, HCI) role switch (HCI_switch_role) instruction to the control module B2, where the HCI_switch_role instruction is used to instruct role switch. Correspondingly, the control module B2 receives the HCI role switch instruction.

S12: The control module B2 sends an HCI command status (HCI command status) instruction to the host module B1, where the HCI command status instruction is used to instruct that the terminal device B can support the role switch. Correspondingly, the host module B1 receives the HCI command status instruction.

S13: The control module B2 sends a link manager protocol (link manager protocol, LMP) slot offset (LMP_slot_offset) instruction to the control module A2, where the LMP_slot offset instruction is used to instruct information on differences between slot boundaries in different piconets, a first LMP instruction may be sent at any time after a baseband paging process, and the first LMP instruction may be expressed as. Correspondingly, the control module A2 receives the LMP slot offset instruction.

S14: The control module B2 sends an LMP switch request (LMP_switch_req) instruction to the control module A2, where the LMP_switch_req instruction is used to instruct the role switch with the terminal device A. Correspondingly, the control module A2 receives the LMP switch request instruction.

S15: The control module A2 sends an LMP accept/reject (LMP_accepted or LMP_not_accepted) instruction to the control module B2, where the LMP_accepted or LMP_not_accepted instruction is used to instruct acceptance or rejection of the role switch. Correspondingly, the control module B2 receives the LMP accept/reject instruction.

S16: When the control module A2 accepts the role switch, the control module A2 sends an HCI role change (HCI_role_change) instruction to the host module A1, where the HCI_role_change instruction is used to instruct the host module A1 to change a role of the terminal device A to a slave. Correspondingly, the host module A1 receives the HCI role change instruction.

S17: The control module B2 sends an HCI role change (HCI_role_change) instruction to the host module B1, where the HCI_role_change instruction is used to instruct the host module B1 to change a role of the terminal device B to a master. Correspondingly, the host module B1 receives the HCI role change instruction.

Generally, a host module of a terminal device is mainly configured to meet requirements of various service scenarios, and a control module is mainly responsible for basic functions such as transmitting and receiving Bluetooth messages, and managing Bluetooth physical connections. The host module and the control module are connected to and communicate with each other through a hardware communication port by using an HCI protocol.

An initiating link manager (link manager, LM) should pause communication over a logical link (Bluetooth ACL-U) that transmits user data. If an encryption mode is set to be "encrypted", and both the terminal device A and the terminal device B support encryption pause, the terminal device initiating LM should start an encryption pause sequence, then send LMP_slot offset, and then send LMP_switch_req.

If the master accepts the role switch and encryption has not been paused, the master may pause communication over the Bluetooth ACL-U logical link, and send LMP_accepted to the slave in response. If the role switch is completed at a baseband level and encryption is paused, the terminal device that pauses the encryption may start to resume an encryption sequence. If the encryption is not paused, the master and the slave re-enable transmission over the Bluetooth ACL-U logical link.

If the master rejects the role switch, the master sends LMP_not_accepted to the slave in response, and the slave re-enables the transmission over the Bluetooth ACL-U logical link.

The host modules may encode audio data. For example, the terminal device A is a mobile phone, and the terminal device B is a Bluetooth headset. After a Bluetooth connection is established between the control module A2 of the mobile phone and the Bluetooth headset, the mobile phone may obtain audio data in an original format that is being played, and send the audio data in the original format to the host module A1; and the host module A1 may encode the audio data in the original format into a format supported by Bluetooth, that is, audio data in a Bluetooth format, for example, encode audio data in a pulse code modulation (pulse code modulation, PCM) format into audio data in a subband coding (subband coding, SBC) format. Then the host module A1 sends the audio data in the Bluetooth format to the control module A2, and the control module A2 sends the audio data in the Bluetooth format to the terminal device B through the established Bluetooth connection.

For example, the terminal device A is a Bluetooth headset (master), and the terminal device B is a mobile phone (slave). A user is listening to music on the mobile phone by using the Bluetooth headset. The mobile phone acting as the slave needs to be in a continuous monitoring state to parse music data. A packet sending frequency per unit time of the mobile phone depends on a polling frequency sent by the Bluetooth headset to the mobile phone. Different kinds of music are corresponding to different bit rates. A higher bit rate indicates a higher polling frequency, a higher time-sharing ratio of the mobile phone to monitor a Bluetooth ACL, and more air interface resources occupied by Bluetooth per unit time. If the mobile phone is still in a Wi-Fi data transmission state in this case, Wi-Fi using the same 2.4 GHz antenna as Bluetooth has a lower time-sharing ratio per unit time. As a result, a data transmission rate of a Wi-Fi service is reduced.

Currently, most terminal devices require that Wi-Fi and Bluetooth use the same 2.4 G antenna to operate at the same time in many scenarios. However, a Wi-Fi module and a Bluetooth module of a terminal device may interfere with each other when frequently initiating 2.4 G scanning at the same time, resulting in performance degradation of the terminal device in a Wi-Fi and Bluetooth coexistence scenario.

Figure 2:
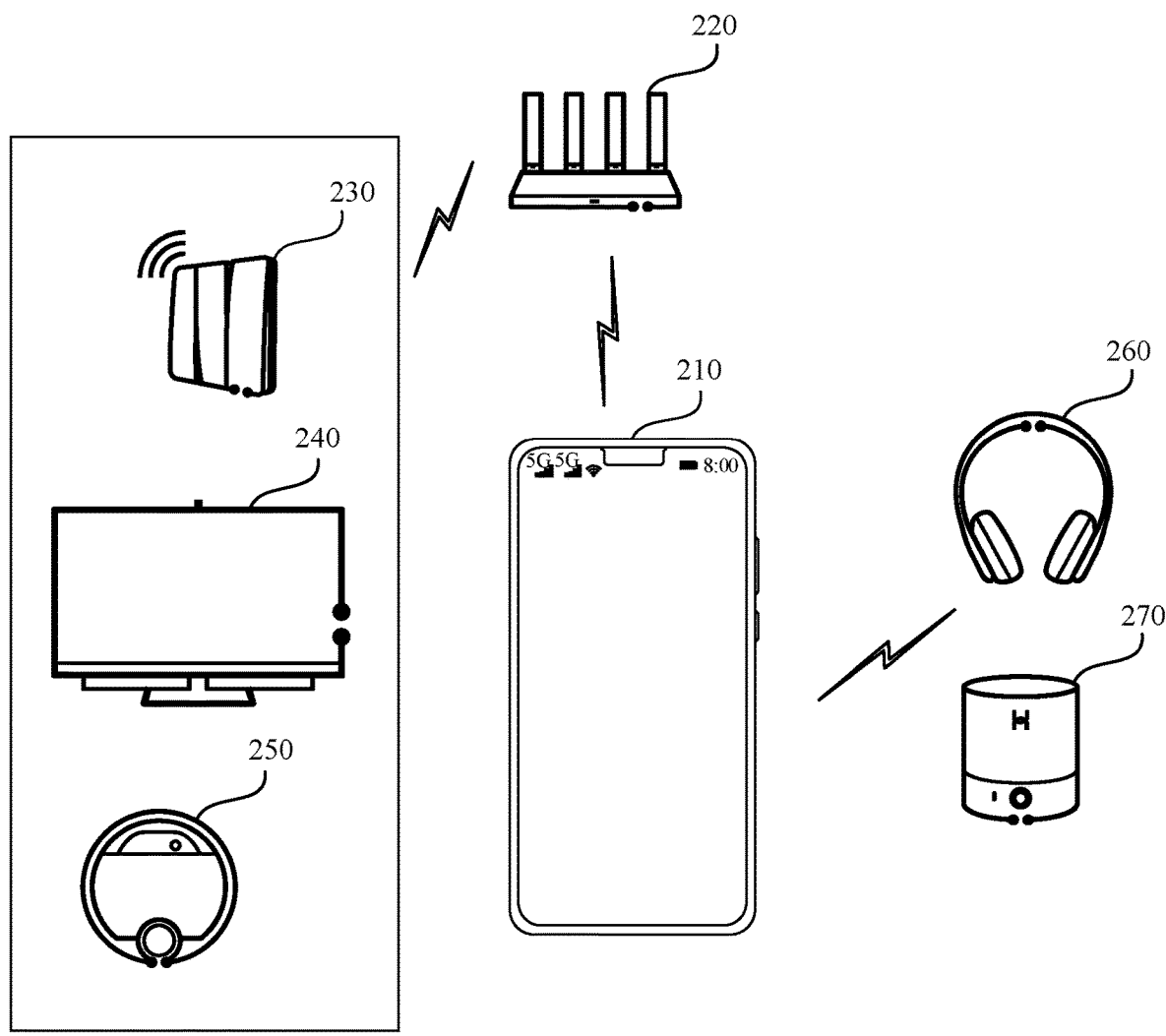
FIG. 2 is a diagram of an example of a Wi-Fi and Bluetooth coexistence scenario according to an embodiment of this application.

For example, FIG. 2 is a diagram of an example of a Wi-Fi and Bluetooth coexistence scenario according to an embodiment of this application. As shown in FIG. 2, the scenario may be a smart home scenario, and the scenario may include a mobile phone 210, a wireless router 220, a smart switch 230, a smart TV 240, a sweeper 250, a Bluetooth headset 260, a Bluetooth speaker 270, and the like.

The mobile phone 210 may be connected to the Bluetooth headset 260 and the Bluetooth speaker 270 through Bluetooth, and may be connected to the smart switch, the smart TV 240, and the sweeper 250 by using the wireless router 220.

Figure 3:
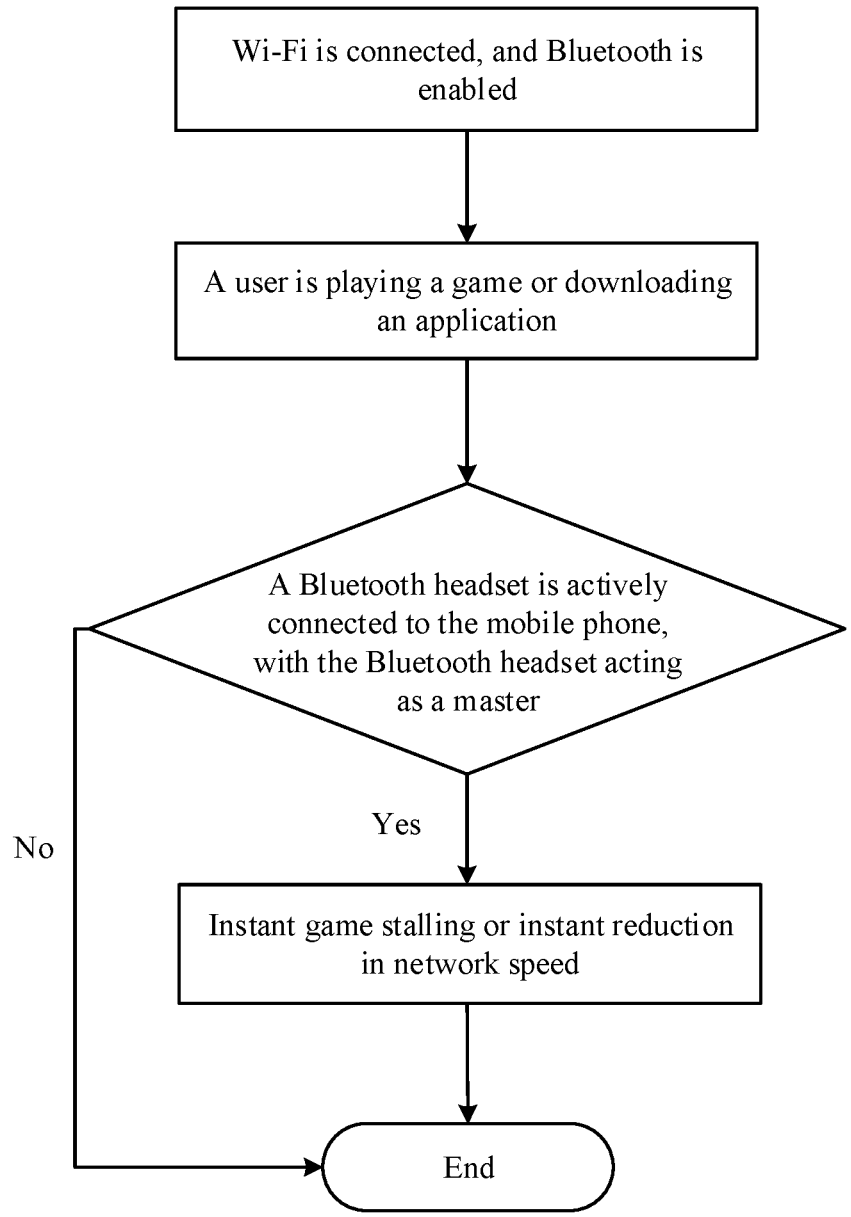
FIG. 3 is a flowchart in a Wi-Fi and Bluetooth coexistence scenario according to an embodiment of this application.

For example, as shown in FIG. 3, FIG. 3 is a flowchart in a Wi-Fi and Bluetooth coexistence scenario according to an embodiment of this application. In FIG. 3, using that the terminal device is a mobile phone as an example, after Wi-Fi and Bluetooth functions of the mobile phone are enabled, and assuming that a user is playing a game or downloading an application online over Wi-Fi, if the Bluetooth headset is actively connected to the mobile phone to establish a Bluetooth ACL with the mobile phone, the user may use the Bluetooth headset to listen to music on the mobile phone over the Bluetooth ACL. Because the Bluetooth headset is a device that actively initiates a Bluetooth connection, the Bluetooth headset is a master, and the mobile phone is a slave in a network where the mobile phone and the Bluetooth headset are located. Because the mobile phone acting as the slave needs to continuously monitor the Bluetooth ACL, has a higher Bluetooth time-sharing ratio, and occupies air interface resources of Wi-Fi. This will lead to problems such as instant game stalling or instant reduction in network speed.

It should be understood that, in this application, a Wi-Fi communication technology and a Bluetooth communication technology are used as examples for description. In addition, the method provided in this embodiment of this application can also be used to resolve the problems of preemption of air interface resources and mutual interference caused by other different communication technologies sharing the same air interface resources. This is not limited in this embodiment of this application.

Figure 4:
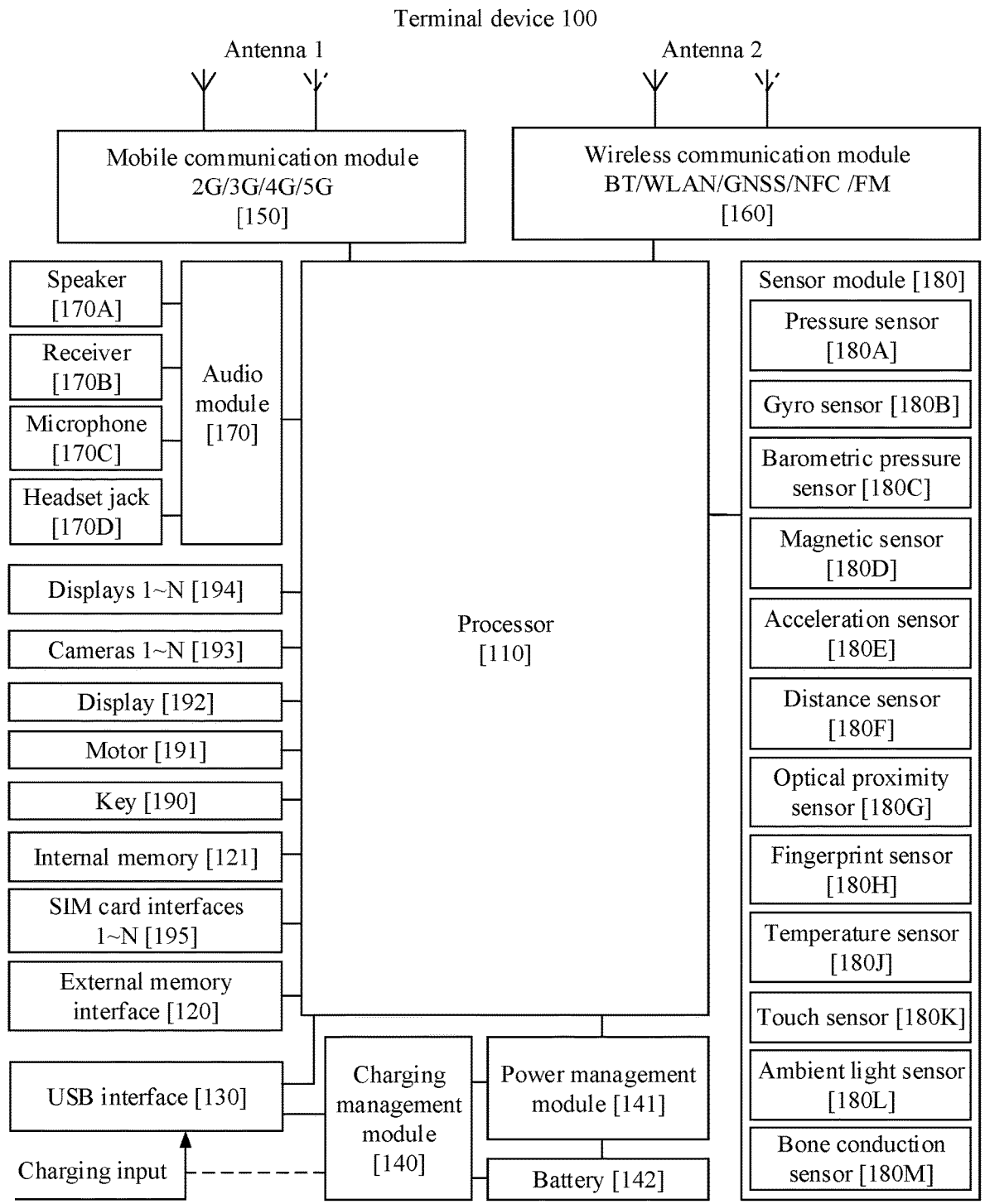
FIG. 4 is a schematic diagram of a structure of a terminal device according to an embodiment of this application.

FIG. 4 is a schematic diagram of a structure of a terminal device 100 according to an embodiment of this application. As shown in FIG. 4, the terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor 180, a key 190, a motor 191, an indicator 192, a camera 193, a display 194, a subscriber identification module (subscriber identification module, SIM) card interface 195, and the like. It may be understood that the structure illustrated in this embodiment does not constitute a specific limitation on the terminal device 100. In some other embodiments of this application, the terminal device 100 may include more or fewer components than those shown in the figure, or combine some components, or split some components, or have different component arrangements. The illustrated components may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a display processing unit (display processing unit, DPU), and/or a neural-network processing unit (neural-network processing unit, NPU). Different processing units may be independent components, or may be integrated in one or more processors. In some embodiments, the terminal device 100 may also include one or more processors 110. The processor may be a nerve center and a command center of the terminal device 100. The processor may generate an operation control signal based on an instruction operation code and a timing signal, to complete control of instruction fetch and instruction execution. A memory may further be disposed in the processor 110, to store instructions and data. In some embodiments, the memory in the processor 110 is a cache. The memory may store instructions or data used or cyclically used by the processor 110. If the processor 110 needs to use the instructions or the data again, the instructions or the data may be directly invoked from the memory. Therefore, repeated access is avoided, and a waiting time of the processor 110 is reduced, thereby improving efficiency of the terminal device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a USB interface. The USB interface 130 is an interface that complies with USB standard specifications, and may be specifically a Mini USB interface, a Micro USB interface, a USB Type C interface, or the like. The USB interface 130 may be configured to connect to a charger to charge the terminal device 100, or may be configured to transmit data between the terminal device 100 and a peripheral device, or may be configured to connect to a headset to play audio by using the headset.

It may be understood that an interface connection relationship between the modules illustrated in this embodiment of this application is an example for description, and does not constitute a limitation on the structure of the terminal device 100. In some other embodiments of this application, the terminal device 100 may alternatively use an interface connection mode that is different from those in the foregoing embodiments, or use a combination of a plurality of interface connection modes.

A wireless communication function of the terminal device 100 may be implemented by using the antenna 1, the antenna 2, the mobile communication module 150, the wireless communication module 160, a modem processor, a baseband processor, and the like. The antenna 1 and the antenna 2 are configured to transmit and receive electromagnetic wave signals. Each antenna in the terminal device 100 may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a wireless communication solution that is applied to the terminal device 100, including 2G/3G/4G/5G and the like. The mobile communication module 150 may include at least one filter, a switch, a power amplifier, a low noise amplifier, and the like. The mobile communication module 150 may receive an electromagnetic wave by using the antenna 1, perform processing such as filtering and amplification on the received electromagnetic wave, and transmit a processed electromagnetic wave to the modem processor for demodulation. The mobile communication module 150 may further amplify a signal modulated by the modem processor and convert, by using the antenna 1, the signal into electromagnetic waves for radiation. In some embodiments, at least some functional modules of the mobile communication module 150 may be disposed in the processor 110. In some embodiments, at least some functional modules of the mobile communication module 150 may be disposed in the same component as at least some modules of the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the receiver 170B, and the like), or displays an image or a video by using the display 194. In some embodiments, the modem processor may be an independent component. In some other embodiments, the modem processor may be independent of the processor 110, and is disposed in the same component as the mobile communication module 150 or other functional modules.

The wireless communication module 160 may provide a wireless communication solution applied to the terminal device 100, including a wireless local area network (wireless local area network, WLAN), Bluetooth (bluetooth), a global navigation satellite system (global navigation satellite system, GNSS), frequency modulation (frequency modulation, FM), NFC, an infrared (infrared, IR) technology, and the like. The wireless communication module 160 may be one or more components integrating at least one communication processor module. The wireless communication module 160 receives an electromagnetic wave by using the antenna 2, modulates and filters an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, the antenna 1 of the terminal device 100 is coupled to the mobile communication module 150, and the antenna 2 is coupled to the wireless communication module 160, so that the terminal device 100 may communicate with a network and another device by using a wireless communication technology. The wireless communication technology may include GSM, GPRS, CDMA, WCDMA, TD-SCDMA, LTE, GNSS, WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation systems, SBAS).

The terminal device 100 may implement a display function by using the GPU, the display 194, the application processor, and the like. The application processor may include an NPU and/or a DPU. The GPU is a microprocessor for image processing, and connects the display 194 to the application processor. The GPU is configured to perform mathematical and geometric calculations for graphics rendering. The processor 110 may include one or more GPUs that execute instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, or quantum dot light emitting diode (quantum dot light emitting diodes, QLED). In some embodiments, the terminal device 100 may include one or N displays 194, where N is a positive integer greater than 1.

The terminal device 100 may implement a photographing function by using an ISP, one or more cameras 193, a video codec, the GPU, one or more displays 194, the application processor, and the like.

The external memory interface 120 may be configured to connect to an external memory card such as a Micro SD card, so as to expand a storage capacity of the terminal device 100. The external memory card communicates with the processor 110 by using the external memory interface 120, to implement a data storage function. For example, data files such as music, photos, and videos are stored in the external memory card.

The internal memory 121 may be configured to store one or more computer programs, where the one or more computer programs include instructions. The processor 110 may run the instructions stored in the internal memory 121, so that the terminal device 100 can perform various function applications and data processing. The internal memory 121 may include a program storage area and a data storage area. The program storage area may store an operating system; and the program storage area may also store one or more applications (such as gallery and contacts). The data storage area may store data (such as photos and contacts) created during use of the terminal device 100. In addition, the internal memory 121 may include a high-speed random access memory, and may further include a non-volatile memory, such as at least one magnetic disk storage device, a flash memory device, or a universal flash storage (universal flash storage, UFS).

The terminal device 100 may implement an audio function, such as music playing and recording, by using the audio module 170, the speaker 170A, the receiver 170B, the microphone 170C, the headset jack 170D, the application processor, and the like.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

A software system of the terminal device 100 may use a layered architecture, an event-driven architecture, a microkernel architecture, a micro-service architecture, or a cloud architecture. In this embodiment of this application, an Android (Android) system with a layered architecture is used as an example to describe a software architecture of a terminal device 100.

Figure 5:
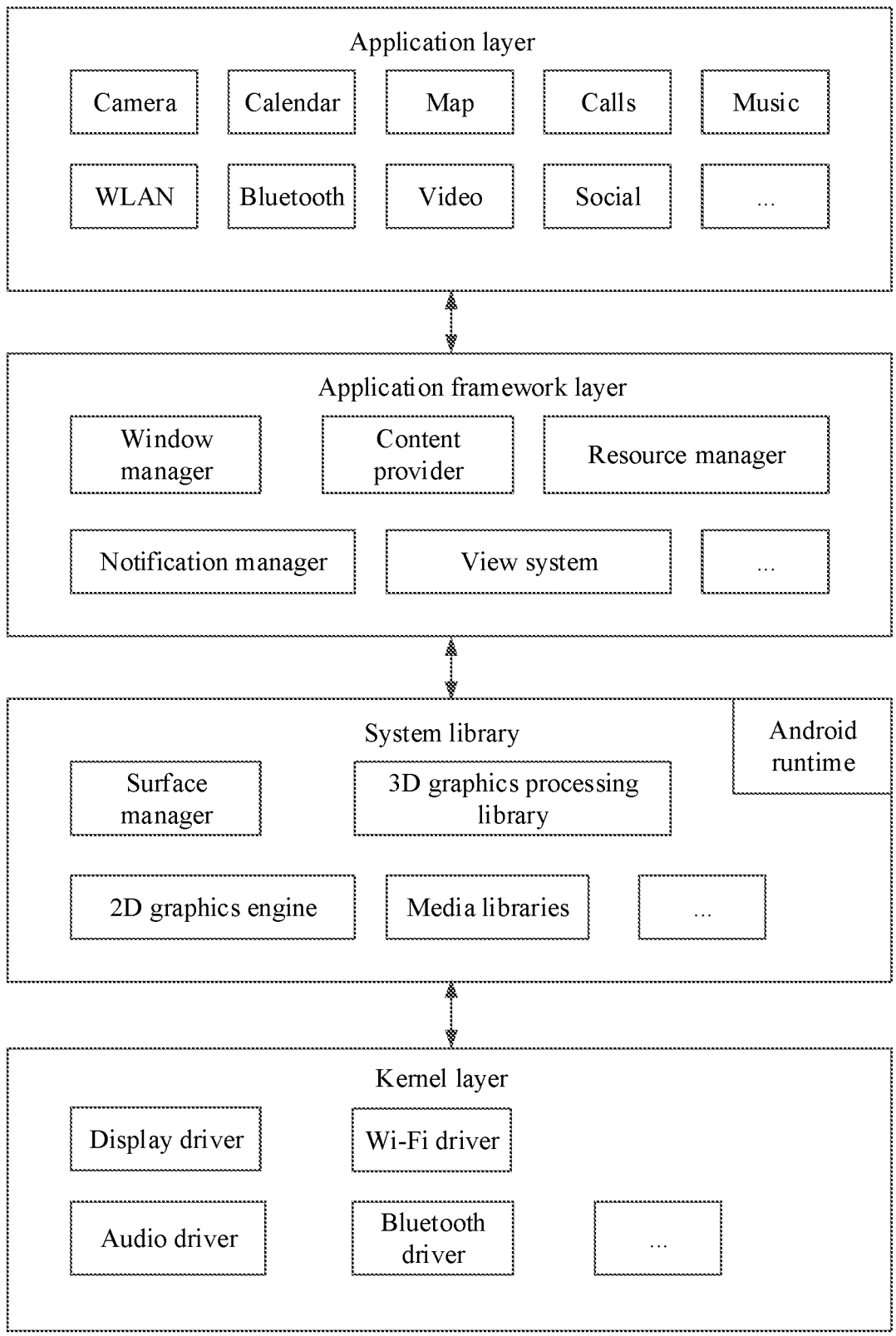
FIG. 5 is a block diagram of a software architecture of a terminal device according to an embodiment of this application.

FIG. 5 is a block diagram of a software architecture of a terminal device according to an embodiment of this application. The layered architecture divides a software system of the terminal device 100 into several layers, and each layer has a clear role and division of labor. The layers communicate with each other by using software interfaces. In some embodiments, the Android system may be divided into an application layer (application, APP), an application framework layer (application framework), an Android runtime (Android runtime) and system library, and a kernel layer (kernel).

The application layer may include a series of application packages. The application layer runs an application by invoking an application programming interface (application programming interface, API) provided by the application framework layer. As shown in FIG. 3, the application packages may include applications such as Camera, Calendar, Maps, Calls, Music, WLAN, Bluetooth, Video, Social, Gallery, Navigation, and SMS.

The application framework layer provides an API and a programming framework for applications at the application layer. The application framework layer includes some predefined functions. As shown in FIG. 3, the application framework layer may include a window manager, a content provider, a resource manager, a notification manager, a view system, a phone manager, and the like.

The window manager is configured to manage a window program. The window manager may obtain a display size, determine whether there is a status bar, lock a screen, take a screenshot, and the like.

The content provider is configured to store and obtain data, and enable these data to be accessible to an application. The data may include videos, images, audio, calls made and received, browsing history and bookmarks, a personal address book, and the like. The view system includes visual controls, such as a control for displaying text and a control for displaying pictures.

The view system may be configured to build an application. A display interface may include one or more views. For example, a display interface including an SMS notification icon may include a view for displaying text and a view for displaying pictures.

The phone manager is configured to provide communication functions of the terminal device 100, such as call state management (including connecting, hanging up, or the like).

The resource manager provides resources for applications, such as a localized string, an icon, a picture, a layout file, and a video file.

The notification manager enables an application to display notification information in the status bar, and may be configured to convey a notification type message, where the displayed notification information may automatically disappear after a short pause without user interaction. For example, the notification manager is configured to notify download completion, message reminding, and the like. The notification manager may alternatively be a notification that appears in the status bar at top of the system in a form of a graph or a scroll bar text, for example, a notification of an application running in the background, or a notification that appear on a screen in the form of a dialog window. For example, a text message is displayed in the status bar, a prompt tone is made, the terminal device 100 vibrates, and an indicator lamp flashes.

The Android runtime includes a core library and a virtual machine. The Android runtime is responsible for scheduling and management of an Android system. The core library includes two parts: functions to be invoked by a java language, and a core library of Android. The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection. The system library may include a plurality of functional modules, such as a surface manager (surface manager), media libraries (media libraries), a 3D graphics processing library (for example, an OpenGL ES), and a 2D graphics engine (for example, an SGL).

The surface manager is configured to manage a display subsystem, and provide fusion of 2D and 3D layers for a plurality of applications. The media libraries support playback and recording of audio and videos in a plurality of commonly used formats, still image files, and the like. The media libraries may support a plurality of audio and video encoding formats, such as MPEG4, H.264, MP3, AAC, AMR, JPG, and PNG. The 3D graphics processing library is used to implement 3D graphics drawing, image rendering, composition, layer processing, and the like. The 2D graphics engine is a graphics engine for 2D graphics.

The kernel layer is a layer between hardware and software. The kernel layer is used to drive the hardware to enable the hardware to operate. The kernel layer includes at least a display driver, an audio driver, a Wi-Fi driver, and a Bluetooth driver. This is not limited in this embodiment of this application. For example, in this embodiment of this application, the kernel layer uses the Wi-Fi driver to drive the antenna 2 (hardware) in the terminal device 100, so as to implement Wi-Fi data transmission. Alternatively, the kernel layer uses the Bluetooth driver to drive the antenna 2 (hardware) in the terminal device 100, so as to implement Bluetooth data transmission.

The terminal device in this embodiment of this application may be a handheld device with a wireless connection function, a vehicle-mounted device, and the like. The terminal device may also be referred to as a terminal (terminal), user equipment (user equipment, UE), a mobile station (mobile station, MS), a mobile terminal (mobile terminal, MT), and the like. Currently, some examples of the terminal include: a mobile phone (mobile phone), a tablet computer, a smart TV, a notebook computer, a Pad (Pad), a palm computer, a mobile Internet device (mobile internet device, MID), a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), a cell phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal device in a 5G network, or a terminal device in a public land mobile network (public land mobile network, PLMN) that will evolve in the future. A specific technology and a specific device form used for the terminal device are not limited in this embodiment of this application.

As an example rather than a limitation, in this embodiment of this application, the terminal device may alternatively be a wearable device. A wearable device may also be referred to as a wearable smart device, which is a generic term for wearable devices such as glasses, gloves, watches, clothing, and shoes that are intelligently designed and developed from daily wears by using wearable technologies. The wearable device is a portable device that is worn directly on a body or integrated into clothing or accessories of a user. The wearable device is not merely a hardware device, but can implement powerful functions through software support, data interaction, and cloud interaction. Generalized wearable smart devices include full-featured and large-sized wearable smart devices that can implement all or some functions without relying on smart phones, such as smart watches or smart glasses. Generalized wearable smart devices only focus on a type of application functions, and need to be used together with other devices such as smart phones, for example, various smart bands and smart ornaments for monitoring physical signs.

In addition, in this embodiment of this application, the terminal device may also be a terminal device in an Internet of Things (internet of things, IoT) system. IoT is an important part in development of information technologies in the future, and a main technical feature thereof is to connect things to a network by using a communication technology, so as to achieve an intelligent network with man-machine interconnection and interconnection of things.

The terminal device in this embodiment of this application may also be referred to as user equipment (user equipment, UE), a mobile station (mobile station, MS), a mobile terminal (mobile terminal, MT), an access terminal, a subscriber unit, a subscriber station, a mobile radio station, a mobile station, a remote station, a remote terminal, a mobile device, a user terminal, a terminal, a wireless communication device, a user agent, or a user apparatus.

At least two terminal devices are used in this embodiment of this application. For ease of understanding, a first terminal device and a second terminal device are used as an example for description. It should be understood that both the first terminal device and the second terminal device may have an architecture shown in FIG. 4 and/or FIG. 5.

Figure 6:
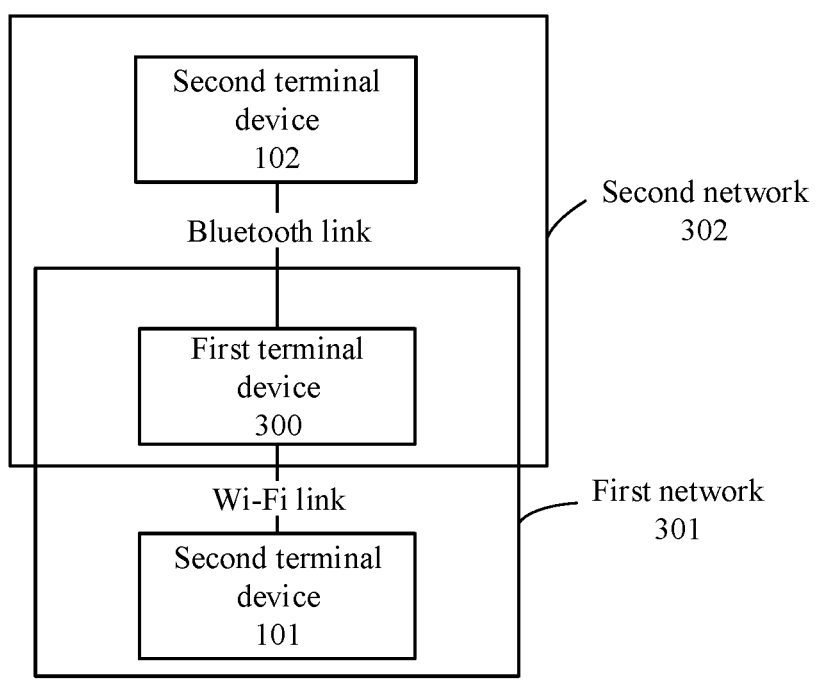
FIG. 6 is a schematic diagram of a network architecture according to an embodiment of this application.

FIG. 6 is a schematic diagram of a network architecture 400 according to an embodiment of this application. As shown in FIG. 6, the network architecture 400 includes a first network 301 and a second network 302. The first network 301 includes a first terminal device 300 and a second terminal device 101, and the second network 302 includes the first terminal device 300 and a second terminal device 102. The first terminal device 300, the second terminal device 101, and the second terminal device 102 may have a hardware structure as shown in FIG. 4 and/or a software architecture as shown in FIG. 5.

For example, a 2.4 GHz Wi-Fi link is established between the first terminal device 300 (for example, a mobile phone) and the second terminal device 101 (for example, a router) in the first network 301, and is transmitting Wi-Fi service data.

For example, a Bluetooth link is established between the first terminal device 300 (for example, a mobile phone) and the second terminal device 102 (for example, a Bluetooth headset) in the second network 302, and is transmitting Bluetooth service data. The Bluetooth link is established upon request of the second terminal device 102 by actively sending a paging (paging) message to the first terminal device 300. In this case, the second terminal device 102 is a master in the second network 302, and the first terminal device 300 is a slave in the second network 302.

It should be understood that a second terminal device is shown in the first network 301, and the first network 301 may further include another second terminal device to establish a Wi-Fi connection or Bluetooth connection with the first terminal device. The same is true for the first network 302. This is not limited in this embodiment of this application.

For example, the Bluetooth link may be a Bluetooth ACL, and the Bluetooth ACL may be established by the second terminal device 102 (for example, a Bluetooth headset) actively initiating a connection with the first terminal device 300 (for example, a mobile phone). It should be understood that the slave needs to continuously monitor a link to synchronize a message sent by the master. Therefore, the first terminal device 300 needs to frequently monitor the Bluetooth link to receive Bluetooth service data sent by the second terminal device 102. Due to limitation of costs and hardware, Wi-Fi and Bluetooth usually share the same 2.4 GHz antenna (for example, the antenna 2 in FIG. 1) for data transmission, and air interface resources on the antenna are limited and fixed per unit time, so that the first terminal device 300 in the second network 302 will also use the same antenna to monitor the Bluetooth link. Therefore, frequent monitoring of the Bluetooth link by the first terminal device 300 in the second network 302 will increase a Bluetooth time-sharing ratio, which affects a time-sharing ratio of an ongoing Wi-Fi service of the first terminal device 300 in the first network 301. As a result, a Wi-Fi data transmission rate is reduced.

The air interface resources may be time domain resources, that is, in the second network 302, the first terminal device 300 acting as the slave frequently monitors the Bluetooth link and competes with the ongoing Wi-Fi service for service time of the antenna, and different service times will lead to different time-sharing ratios. Generally, a time-sharing ratio for Wi-Fi services and Bluetooth services of mobile phones may be specified on chips from different manufacturers. At the specified time-sharing ratio, mutual interference caused by Wi-Fi and Bluetooth that use the same air interface resource may be minimized. For example, it can be specified that 60% of time of the antenna is used to transmit Wi-Fi service data and 40% of the time of the antenna is used to transmit Bluetooth service data. However, the ratio may change dynamically based on a current service of a mobile phone. For example, when the mobile phone downloads a resource over Wi-Fi and transmits high-bit-rate audio data with the Bluetooth headset through a Bluetooth connection, the transmission of the high-bit-rate audio data requires a higher Bluetooth time-sharing ratio, so that the antenna of the mobile phone may spend 40% of the time downloading the resource and 60% of the time transmitting the high-bit-rate audio data; that is, Bluetooth occupies service time of the antenna for Wi-Fi and reduces the time-sharing ratio for the Wi-Fi service, resulting in network stalling and a lower resource download speed over Wi-Fi.

In view of this, embodiments of this application provide a method for monitoring a link and a terminal device. When a Bluetooth link is established between a first terminal device (as a slave) and a second terminal device (as a master), and the first terminal device is in a Wi-Fi and Bluetooth coexistence scenario, the first terminal device may initiate role switch. That is, the first terminal device is used as a master and the second terminal device is used as a slave to transmit Bluetooth data. The first terminal device acting as the master may control a slot for monitoring a Bluetooth ACL, so as to reduce impact of monitoring of the Bluetooth ACL by the first terminal device on a time-sharing ratio for an ongoing Wi-Fi service and/or Bluetooth service of the first terminal device, and increase a data transmission rate of the ongoing Wi-Fi service and/or Bluetooth service.

For ease of description, that a first terminal device 300 in a first network 301 is performing a Wi-Fi service and the first terminal device 300 in a second network 302 is performing a Bluetooth service is used as an example below for description.

Before the method for monitoring a link provided in this embodiment of this application is described, the following descriptions are made.

First, in the following embodiments, all terms and abbreviations, such as a Wi-Fi service, a Bluetooth service, a monitoring period, a time-sharing ratio, and role switch are illustrative examples for ease of description, and should not constitute any limitation on this application. This application does not exclude the possibility of defining other terms for implementing the same or similar functions in existing or future agreements.

Second, in the following embodiments, "first", "second", and various numerical numbers are merely distinguished for ease of description instead of limiting the scope of embodiments of this application, for example, distinguish between different terminal devices.

Third, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The symbol "/" usually indicates an "or" relationship between the associated objects. "At least one of the following items" or an expression similar thereto means any combination of these items, including a single item or any combination of plural items. For example, "at least one of a, b, or c" may represent a, or b, or c, or a and b, or a and c, or b and c, or a, b, and c, where a, b, and c may be a singular or plural.

It should be understood that role switch in this embodiment of this application may also be referred to as role switchover, role conversion, or role exchange, which is not limited in this embodiment of this application.

Figure 7:
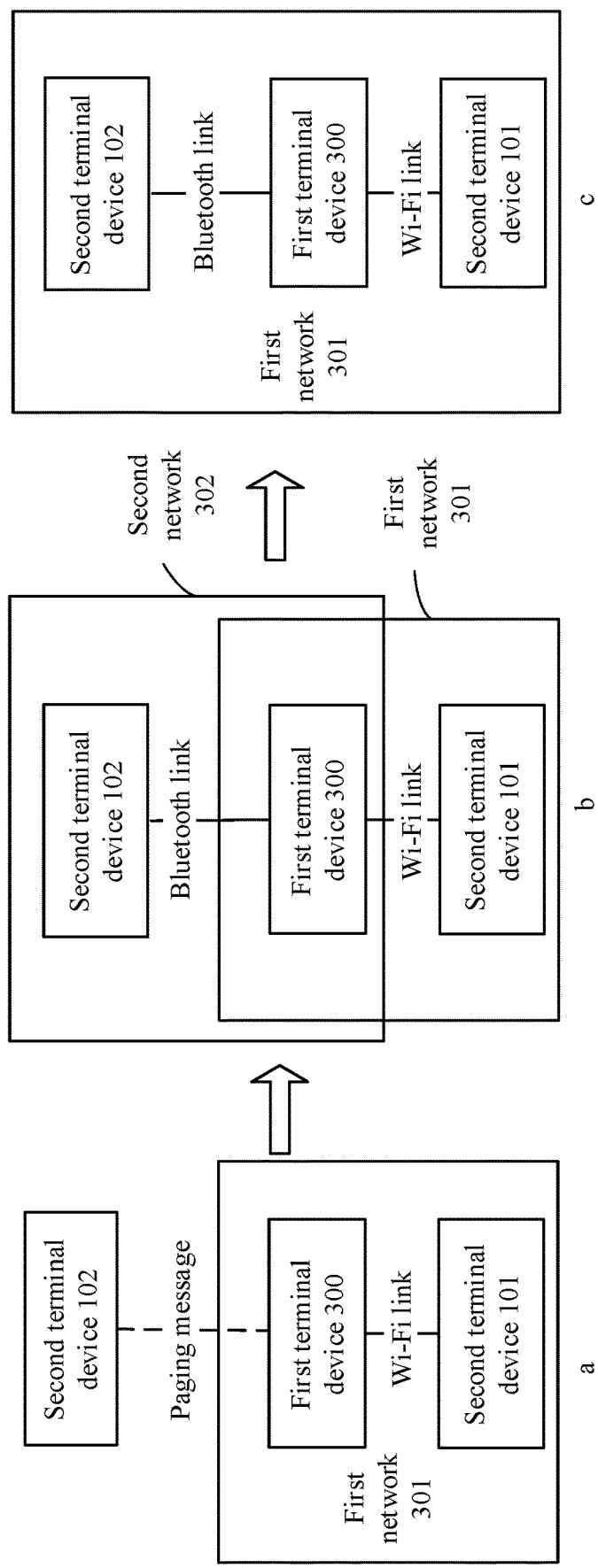
FIG. 7 is a schematic diagram showing a process of role switch between terminal devices according to an embodiment of this application.

FIG. 7 is a schematic diagram showing a process of role switch between terminal devices according to an embodiment of this application. FIG. 7 includes a first terminal device 300, a second terminal device 101, and a second terminal device 102. The process of the role switch includes three switch states: a, b, and c.

As shown in a in FIG. 7, in the first network 301, a Wi-Fi link is established between the first terminal device 300 and the second terminal device 101, and is transmitting Wi-Fi data. The first terminal device 300 is a master, and the second terminal device 101 is a slave. In this case, the second terminal device 102 sends a paging (paging) message to the first terminal device 300, and the paging message is used to request to establish a Bluetooth link (for example, a Bluetooth ACL) with the first terminal device.

As shown in b in FIG. 7, after receiving the paging message sent by the second terminal device 102, the first terminal device 300 can establish a Bluetooth link with the second terminal device 102. After the Bluetooth link is established, the first terminal device 300 and the second terminal device 102 are in a networking relationship to form a second network 302. Because the paging message requesting to establish the Bluetooth link is initiated by the second terminal device 102, in the second network 302, the second terminal device 102 is a master, and the first terminal device 300 is a slave.

A network architecture in a switch state shown in b in FIG. 7 may be corresponding to the network architecture 400 shown in FIG. 6.

After the Bluetooth link is established, the first terminal device 300 may detect whether the first terminal device 300 is in a Wi-Fi and Bluetooth coexistence scenario. If the first terminal device 300 is in the Wi-Fi and Bluetooth coexistence scenario, the first terminal device may initiate role switch.

As shown in c in FIG. 7, after the first terminal device initiates the role switch and the role switch succeeds, the second terminal device 102 joins the first network 301 and becomes a slave in the first network 301, and the first terminal device 300 is a master.

Figure 8:
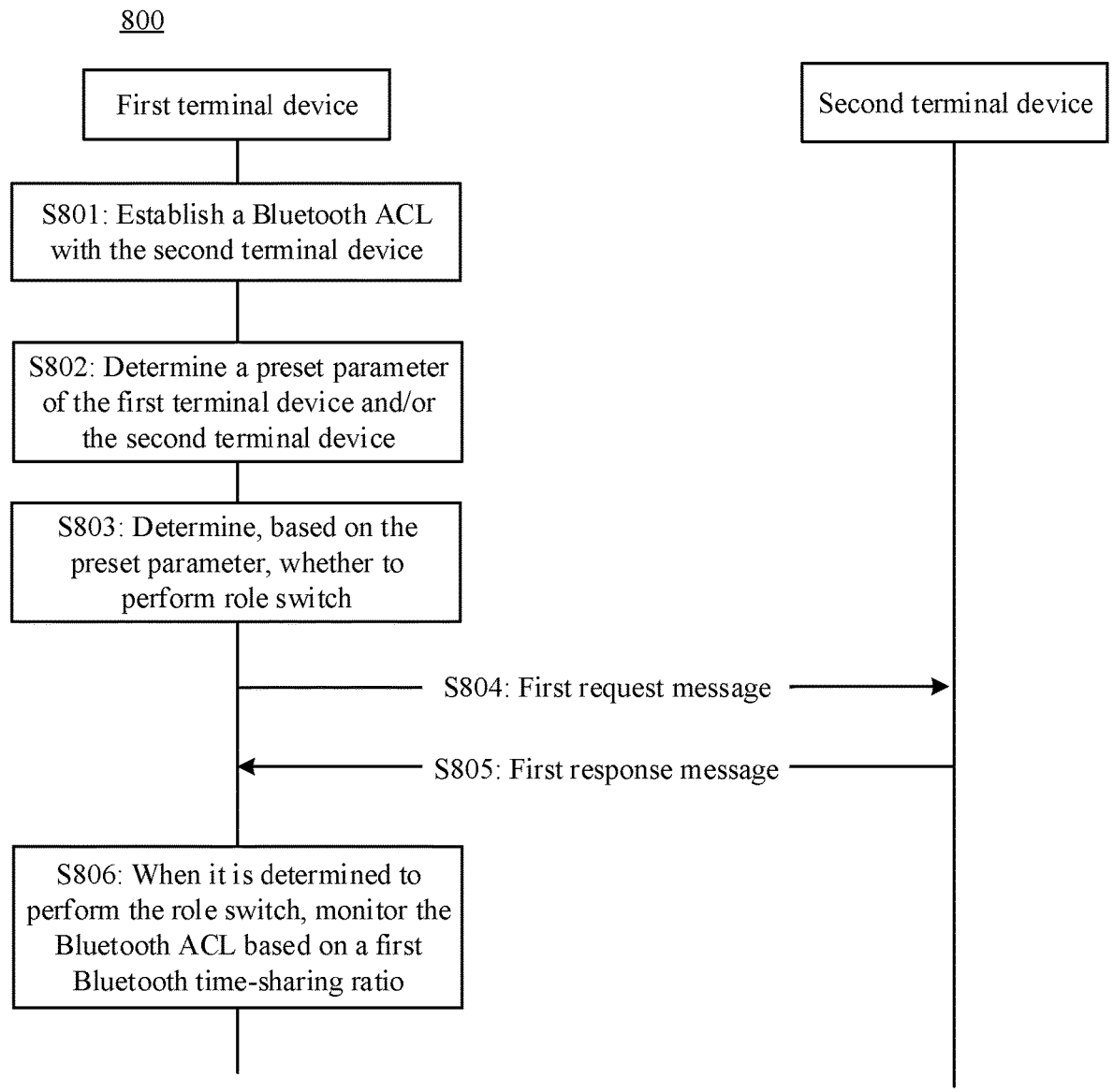
FIG. 8 is a schematic flowchart of a method for monitoring a link according to an embodiment of this application.

FIG. 8 is a schematic flowchart of a method 800 for monitoring a link according to an embodiment of this application, applied to a first terminal device. The method 800 includes:

S801: A Bluetooth ACL is established between the first terminal device and a second terminal device, where the first terminal device is a slave and the second terminal device is a master, and the first terminal device has established a Wi-Fi link.

For example, the first terminal device is a mobile phone. After being powered on, the mobile phone is triggered to connect to Wi-Fi and enable Bluetooth. After Wi-Fi of the mobile phone is connected and Bluetooth is enabled, a user can use the mobile phone to play a game, surf the Internet, download an application, and transmit data (such as pictures, files, and videos), or the user may also answer a call and listen to music by using a Bluetooth headset that has established a Bluetooth connection with the mobile phone.

In a possible implementation, icons of WLAN and Bluetooth are displayed in a notification bar of the mobile phone, and the user may enable WLAN and Bluetooth in the notification bar of the mobile phone. A Wi-Fi technology can be used for WLAN. If the mobile phone detects that the user clicks on the icon of WLAN or Bluetooth in the notification bar, the mobile phone connects to Wi-Fi or enables Bluetooth in response to the click of the user.

In another possible implementation, a setting interface of the mobile phone is provided with WLAN and Bluetooth enabling switches, and the user may also enable WLAN and Bluetooth on the setting interface of the mobile phone. If the mobile phone detects that the user clicks on WLAN or Bluetooth on the setting interface, the mobile phone connects to Wi-Fi or enables Bluetooth in response to the click of the user.

The foregoing method for connecting the mobile phone to Wi-Fi or enabling Bluetooth is only described as an example, and any method that can implement the connection is applicable to this application, which is not limited herein.

For example, the first terminal device is a mobile phone, and the second terminal device is a Bluetooth headset. After enabling Bluetooth, the mobile phone may receive a paging message from the Bluetooth headset, and the paging message is used to request to establish a Bluetooth ACL with the mobile phone. The mobile phone may scan (scan) external pagings at a regular interval, and when the mobile phone scans an external paging message, a Bluetooth ACL will be established between the mobile phone and the Bluetooth headset in response (response) to the paging message.

S802: A preset parameter of the first terminal device and/or the second terminal device is determined.

For example, the first terminal device may add the second terminal device to a blacklist/whitelist; and the first terminal device can query the blacklist to identify second terminal devices that reject to act as slaves, and can query the whitelist to identify second terminal devices that accept to act as slaves, so as to decide whether to send a request message for role switch to the second terminal device.

For example, a memory of the first terminal device stores historical switch information during Bluetooth communication with the second terminal device, and the historical switch information includes historical switch information of the first terminal device and/or historical switch information of the second terminal device. The historical switch information of the first terminal device may include information such as a power consumption increment of the first terminal device acting as a slave, and a loss of an electricity quantity of the first terminal device acting as a slave. The historical switch information of the second terminal device may include hardware capability information of the second terminal device, performance information of the second terminal device acting as a slave, stability information of the second terminal device acting as a slave, and the like.

S803: Determine, based on the preset parameter, whether to perform role switch.

For example, the preset parameter includes at least one of the following: Wi-Fi data transmission flow and/or Bluetooth data transmission flow of the first terminal device; or a power consumption increment of the first terminal device acting as a slave; or an electricity quantity of the first terminal device; or an electricity quantity of the second terminal device; or a capability of the second terminal device acting as a slave; or a performance reduction of the second terminal device acting as a slave.

S804: The first terminal device sends a first request message to the second terminal device when it is determined to perform role switch, where the first request message is used to request role switch between the first terminal device and the second terminal device, and a Bluetooth time-sharing ratio per unit time of the master is lower than that of the slave; Correspondingly, the second terminal device receives the first request message.

S805: The second terminal device sends a first response message to the first terminal device, where the first response message is used to confirm or reject the role switch with the first terminal device. Correspondingly, the first terminal device receives the first response message.

S806: When it is determined to perform the role switch, the first terminal device monitors the Bluetooth ACL based on a first Bluetooth time-sharing ratio, where the first Bluetooth time-sharing ratio is lower than a second Bluetooth time-sharing ratio used by the first terminal device to monitor the Bluetooth ACL before the role switch.

It should be understood that the first Bluetooth time-sharing ratio and the second Bluetooth time-sharing ratio in this embodiment of this application each are a Bluetooth time-sharing ratio per unit time, for example, the unit time is 100 ms.

In this embodiment of this application, in a coexistence scenario in which the first terminal device acting as a slave transmits Bluetooth data with the second terminal device, and the first terminal device acting as a master is transmitting Wi-Fi data with another terminal device, the first terminal device may send a first request message for role switch to the second terminal device, to request the first terminal device to act as a master and the second terminal device to act as a slave. In this way, when it is determined to perform the role switch, the first terminal device acting as the master may reduce a Bluetooth time-sharing ratio, and reduce occupation of a Wi-Fi time-sharing ratio, so as to increase a data transmission rate of an ongoing Wi-Fi service.

For example, before the role switch, the second Bluetooth time-sharing ratio of the first terminal device is 80 ms/100 ms, that is, the first terminal device needs to monitor the Bluetooth ACL for 80 ms every 100 ms to receive a message from the second terminal device acting as a master.

For example, after the role switch, the first Bluetooth time-sharing ratio of the first terminal device is 10 ms/100 ms, that is, the first terminal device needs to monitor the Bluetooth ACL for 10 ms every 100 ms. In this way, after the role switch, the first terminal device does not need to frequently monitor the Bluetooth ACL, so as to reduce a Bluetooth time-sharing ratio of the first terminal device, thereby reducing impact on data transmission of an ongoing Wi-Fi service.

In this embodiment of this application, the first terminal device may be corresponding to the first terminal device 300 in FIG. 6, the second terminal device may be corresponding to the second terminal device 102 in FIG. 6, and another terminal device that is transmitting Wi-Fi data with the first terminal device may be corresponding to the second terminal device 101 in FIG. 6.

It should be understood that the first terminal device in this embodiment of this application is in a Wi-Fi data transmission state and/or a Bluetooth data transmission state. With reference to FIG. 6, it may be understood that the first terminal device 300 in the first network 301 is in a Wi-Fi data transmission state and/or a Bluetooth data transmission state. For example, a Wi-Fi link may be established between the first terminal device 300 and the second terminal device

101. For another example, a Bluetooth link may be established between the first terminal device 300 and the second terminal device 101. For another example, a Wi-Fi link may be established between the first terminal device 300 and the second terminal device 102.

It should also be understood that, with reference to FIG. 6, when the first terminal device 300 in the first network 301 is in the Wi-Fi data transmission state and/or the Bluetooth data transmission state, the first terminal device 300 in the second network 302 is continuously monitoring the Bluetooth ACL established with the second terminal device 102.

Figure 9:
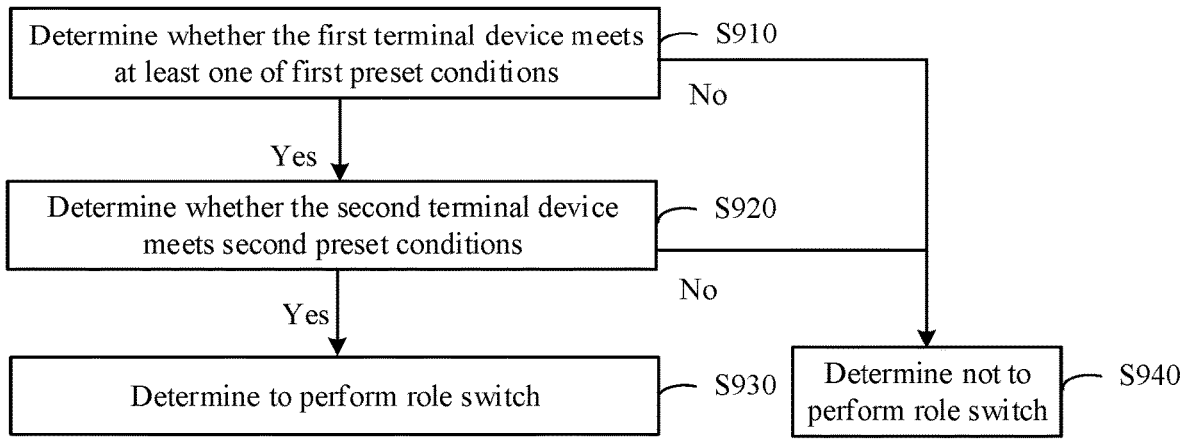
FIG. 9 is a schematic flowchart of a method for determining whether to perform role switch according to an embodiment of this application.

FIG. 9 is a schematic flowchart of a method 900 for determining whether to perform role switch according to an embodiment of this application. The method 900 includes:

S910: The first terminal device determines whether the first terminal device meets at least one of first preset conditions. When the first terminal device meets at least one of the first preset conditions, S920 is performed. When the first terminal device does not meet at least one of the first preset conditions, S940 is performed.

For example, the first preset conditions may include: Wi-Fi data transmission flow and/or Bluetooth data transmission flow of the first terminal device is higher than or equal to a third preset threshold, a power consumption increment of the first terminal device acting as a slave is greater than or equal to a fourth preset threshold, and an electricity quantity of the first terminal device is less than or equal to a fifth preset threshold.

In a possible case, the Wi-Fi data transmission flow and/or Bluetooth data transmission flow of the first terminal device is higher than or equal to the third preset threshold, and the first terminal device may need to initiate role switch. For example, the third preset threshold is 500 kb/s, and the first terminal device is downloading a video over Wi-Fi. In this case, a data transmission flow of a download service is high, for example, 5 M/s, that is, the Wi-Fi data transmission flow is higher than the third preset threshold. Therefore, the first terminal device may further determine whether to perform role switch based on second preset conditions.

In another possible case, by viewing the historical switch information of the first terminal device, the first terminal device finds that a power consumption increment of the first terminal device acting as a slave is greater than or equal to the fourth preset threshold compared with a power consumption increment of the first terminal device acting as a master. In this case, the first terminal device may need to initiate role switch. For example, the fourth preset threshold is 2 dB, and the power consumption increment of the first terminal device acting as a slave recorded in the historical switch information is 3 dB compared with that of the first terminal device acting as a master, that is, the power consumption increment of the first terminal device acting as a slave is greater than or equal to the fourth preset threshold. Therefore, the first terminal device may further determine, based on the second preset conditions, whether to perform role switch.

In still another possible case, the first terminal device detects that an electricity quantity thereof is less than or equal to the fifth preset threshold, and the first terminal device may need to initiate role switch. This is because the first terminal device acting as a slave needs to continuously monitor the Bluetooth ACL, and the monitoring may lead to a loss of the electricity quantity. If the electricity quantity of the first terminal device is lower than the fifth preset threshold, a Wi-Fi service and/or Bluetooth service of the first terminal device may be interrupted due to excessively low electricity quantity. For example, the fifth preset threshold is 30%, and the first terminal device detects that a current electricity quantity is 25%, that is, the electricity quantity of the first terminal device is less than the fifth preset threshold. Therefore, the first terminal device may further determine, based on the second preset conditions, whether to perform role switch.

S920: The first terminal device determines whether the second terminal device meets the second preset conditions. When the second terminal device meets the second preset conditions, S930 is performed. When the second terminal device does not meet the second preset conditions, S940 is performed.

For example, the second preset conditions may include: whether the second terminal device has the capability to act as a slave, whether the electricity quantity of the second terminal device is greater than or equal to a first preset threshold, and whether the performance reduction of the second terminal device acting as a slave is less than or equal to a second preset threshold. The first terminal device further determines whether role switch can be performed based on the second preset conditions.

S930: The first terminal device determines to perform the role switch.

When at least one of the first preset conditions is met and the second preset conditions are met, the first terminal device may determine to perform role switch with the second terminal device.

S940: The first terminal device determines not to perform role switch.

In this embodiment of this application, the first terminal device may first determine, based on the first preset conditions, whether to perform role switch with the second terminal device, and then consider, based on the second preset conditions, whether to perform role switch when the first terminal device meets at least one of the first preset conditions. In this way, a manner of determining whether to perform role switch based on preset conditions of the first terminal device and the second terminal device facilitates implementation of the role switch.

In a possible case, the first terminal device may obtain information on whether the second terminal device has the capability to act as a slave during establishing the Bluetooth ACL with the second terminal device, and the first terminal device may also query saved historical switch information of the second terminal device to check whether the second terminal device has the capability to act as a slave through saved historical switch information of the second terminal device. Because the capability of the second terminal device may not support role switch, the first terminal device may fail to initiate role switch. Therefore, it may be necessary to determine whether the second terminal device has the capability to act as a slave. If the second terminal device has the capability to act as a slave, the first terminal device may send a first request message to the second terminal device to request role switch.

In another possible case, the first terminal device may obtain information on an electricity quantity of the second terminal device when establishing the Bluetooth ACL with the second terminal device. Because the second terminal device acting as a slave needs to continuously monitor the Bluetooth ACL after the role switch, it is also necessary to consider whether the electricity quantity of the second terminal device can meet a requirement for an electricity quantity of a slave. If the electricity quantity is lower than the first preset threshold, the Bluetooth ACL between the first terminal device and the second terminal device may be interrupted due to excessively low electricity quantity, which affects Bluetooth data transmission. For example, the first preset threshold is 30%, and the electricity quantity of the second terminal device is 60%, that is, the electricity quantity of the second terminal device is greater than the first preset threshold. Therefore, the first terminal device may send a first request message to the second terminal device to request role switch.

In still another possible case, the first terminal device may query the saved historical switch information of the second terminal device to check a performance reduction of the second terminal device acting as a slave. The performance reduction is a performance reduction of the second terminal device acting as a slave compared with that of the second terminal device acting as a master. If the performance reduction is greater than or equal to the second preset threshold, Bluetooth data transmission of the second terminal device may be affected. For example, the second preset threshold is 10%, and the performance reduction of the second terminal device acting as a slave is 12%, that is, the performance reduction of the second terminal device acting as a slave is greater than the second preset threshold. Therefore, the first terminal device may send a first request message to the second terminal device to request role switch.

In this embodiment of this application, as an example rather than a limitation, the first terminal device may send a first request message to the second terminal device when at least one of the first preset conditions is met and all the three second preset conditions are met, so as to determine to perform role switch.

As an example rather than a limitation, the first terminal device may also send a first request message to the second terminal device when at least one of the first preset conditions is met and at least one of the second preset conditions is met, so as to determine to perform role switch. This is not limited in this embodiment of this application.

As an example rather than a limitation, the first terminal device may also send a first request message to the second terminal device when all the three first preset conditions are met and all the three second preset conditions are met, so as to determine to perform role switch.

As an example rather than a limitation, the first terminal device may also send a first request message to the second terminal device when all the three first preset conditions are met and at least one of the second preset conditions is met, so as to determine to perform role switch. This is not limited in this embodiment of this application.

It should be understood that the first preset conditions and the second preset conditions are only examples, and the first terminal device may also determine whether to perform role switch based on other possible preset parameters. This is not limited in this embodiment of this application.

Optionally, the preset parameter further includes at least one of a Wi-Fi data transmission rate of the first terminal device, a type of a service that is running in the foreground of the mobile phone, a data transmission rate predicted by a network, or an electricity quantity of the mobile phone. That the first terminal device is a mobile phone and the second terminal device is a Bluetooth headset is used as an example below to describe determining, based on the preset parameter, whether to perform role switch.

For example, a user is playing a game on the mobile phone over Wi-Fi, the Bluetooth headset is actively connected to the mobile phone, and the user is on a call by using the Bluetooth headset. If a data flow of a game service is high, stalling of the game service may be caused when the mobile phone monitors the Bluetooth ACL at a high Bluetooth time-sharing ratio. In this case, the mobile phone may actively initiate a role switch request to reduce the Bluetooth time-sharing ratio of the mobile phone, so as to alleviate stalling of the game service.

For example, the user is downloading an application over Wi-Fi of the mobile phone, the Bluetooth headset is actively connected to the mobile phone, and the user is on a call by using the Bluetooth headset. If a data transmission rate for downloading the application is higher than a preset threshold, an ongoing download service may be slow or interrupted when the mobile phone monitors the Bluetooth ACL at a high Bluetooth time-sharing ratio. In this case, the mobile phone may actively initiate a role switch request to reduce the Bluetooth time-sharing ratio of the mobile phone, so as to reduce impact on a download rate of the download service.

For example, the user is playing a game over Wi-Fi of the mobile phone (game music is not enabled), the Bluetooth headset is actively connected to the mobile phone, and the user is listening to high quality music by using the Bluetooth headset. The high quality music has a high bit rate, and a higher bit rate indicates a higher polling frequency, a higher packet sending frequency per unit time of the mobile phone, and a higher Bluetooth time-sharing ratio per unit time of the mobile phone. On the one hand, to ensure stability of a Bluetooth connection between the mobile phone and the Bluetooth headset, the mobile phone may choose not to perform role switch, and continue to listen to high quality music at a higher packet sending frequency. On the other hand, to ensure smoothness of the game, the mobile phone may choose to perform role switch and actively initiate a role switch request to reduce a Bluetooth time-sharing ratio of the mobile phone, so as to alleviate stalling of the game service caused by a high quality music service.

For example, the mobile phone may also make network prediction based on a network rate within a preset time, and it is assumed that the user is transmitting data over Wi-Fi of the mobile phone, the Bluetooth headset is actively connected to the mobile phone, and the user is listening to music by using the Bluetooth headset. If a network rate of the mobile phone in a first time period continues to increase, the mobile phone may predict that a network rate in a subsequent second time period can meet rate requirements of the ongoing data transmission (for example, transmission of pictures, files, or videos). In this case, the mobile phone may choose not to perform role switch. If a network rate of the mobile phone in a first time period continues to decrease, the mobile phone may predict that a network rate in a subsequent second time period cannot meet rate requirements of the ongoing data transmission. In this case, the first terminal device may actively initiate a role switch request to reduce a Bluetooth time-sharing ratio of the mobile phone, so as to reduce impact on the rate of the ongoing data transmission.

In an optional embodiment, the first request message includes a first time point, and S806 includes: the first terminal device monitors the Bluetooth ACL based on the first Bluetooth time-sharing ratio at the first time point.

In this embodiment of this application, the first time point is carried in the first request message to send to the second terminal device. If the second terminal device determines that role switch may be performed, the first terminal device and the second terminal device switch roles at the first time point, that is, the first terminal device acts as a master to monitor the Bluetooth ACL at the first Bluetooth time-sharing ratio, and the first Bluetooth time-sharing ratio is higher than the second Bluetooth time-sharing ratio when the first terminal device acts as a slave to monitor the Bluetooth ACL, so as to reduce the Bluetooth time-sharing ratio of the first terminal device, and increase a data transmission rate of the ongoing Wi-Fi service.

In an optional embodiment, the first response message includes a second time point, and the second time point is determined by the second terminal device. S806 includes: the first terminal device monitors the Bluetooth ACL based on the first Bluetooth time-sharing ratio at the second time point.

In this embodiment of this application, after receiving the first request message, the second terminal device may obtain the first time point from the first request message. The second terminal device sends the first response message to the first terminal device to confirm role switch with the first terminal device by considering information such as capability, electricity quantity, and performance reduction of the second terminal device acting as a slave. In a possible case, the second terminal device finds, based on judgment, that the second terminal device may transmit data to the first terminal device over the Bluetooth ACL at the first time point, and therefore the second terminal device may select a second time point to avoid data transmission, and send the second time point carried in the first response message to the first terminal device. The second time point is different from the first time point, and role switch at the second time point may avoid impact on data transmission between the first terminal device and the second terminal device. After receiving the first response message, the first terminal device may monitor the Bluetooth ACL at the first Bluetooth time-sharing ratio based on a frequency of the first terminal device at the second time point.

In an optional embodiment, S803 includes: the first terminal device determines not to perform role switch when the following conditions are met: the Wi-Fi data transmission flow and/or Bluetooth data transmission flow of the first terminal device is lower than or equal to the third preset threshold; the power consumption increment of the first terminal device acting as a slave is less than or equal to the fourth preset threshold; and the electricity quantity of the first terminal device is greater than or equal to the fifth preset threshold.

For example, the third preset threshold is 500 kb/s, and the first terminal device is sending a WeChat message over Wi-Fi. In this case, a data transmission flow of a WeChat service is low, such as 10 kb/s, that is, the Wi-Fi data transmission flow is less than the third preset threshold. For example, the fourth preset threshold is 2 dB, and the power consumption increment of the first terminal device acting as a slave recorded in the historical switch information is 1 dB compared with that of the first terminal device acting as a master, that is, the power consumption increment of the first terminal device acting as a slave is less than the fourth preset threshold. For example, the fifth preset threshold is 30%, and the first terminal device detects that a current electricity quantity is 70%, that is, the electricity quantity of the first terminal device is greater than the fifth preset threshold. In this embodiment of this application, the first terminal device meets the foregoing preset conditions. Therefore, the first terminal device may not perform role switch.

In an optional embodiment, S803 includes: the first terminal device determines, based on the preset parameter, whether to perform role switch, including: the first terminal device determines not to perform role switch when at least one of the following conditions is met: the second terminal device does not have the capability to act as a slave; the electricity quantity of the second terminal device is less than or equal to the first preset threshold; or the performance reduction of the second terminal device acting as a slave is greater than or equal to the second preset threshold.

As described above, the first preset conditions of the first terminal device and the second preset conditions of the second terminal device need to be considered when the first terminal device determines whether to perform role switch. When the first terminal device meets the first preset conditions, but the second terminal device does not meet the second preset conditions, the first terminal device does not perform role switch.

It should be understood that sequence numbers of the foregoing processes do not mean execution sequences. The execution sequences of the processes should be determined based on functions and internal logic of the processes, and should not be construed as any limitation on the implementation processes of embodiments of this application.

Figure 10:
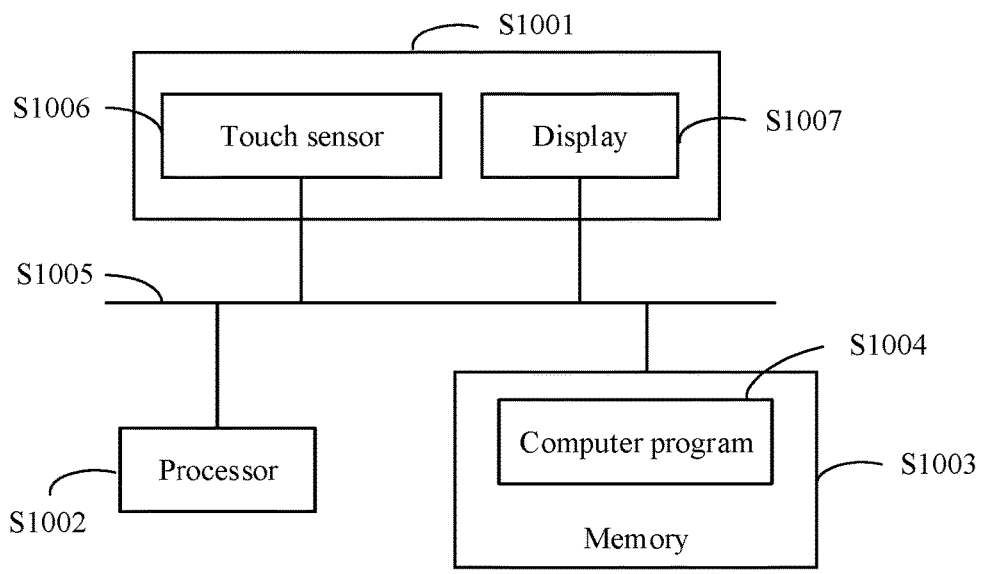
FIG. 10 is a schematic block diagram of a terminal device according to an embodiment of this application.

FIG. 10 is a schematic block diagram of a terminal device according to an embodiment of this application. The terminal device may specifically include a touch screen 1001, one or more processors 1002, and a memory 1003. Optionally, the terminal device may further include one or more applications (not shown in FIG. 10). The components may be connected by using one or more communication buses 1005. The touch screen 1001 includes a touch sensor 1006 and a display 1007. The memory 1003 stores one or more computer programs 1004, the one or more computer programs 1004 are executed by the one or more processors 1002, the one or more computer programs 1004 include instructions, and the instructions may be used to perform relevant steps in the foregoing embodiment.

Optionally, the memory 1003 may include a read-only memory and a random access memory, and provides instructions and data to the processor. A part of the memory may further include a non-volatile random access memory. For example, the memory may further store information about a device type. The one or more processors 1002 may be configured to execute instructions stored in the memory, and when the processor executes the instructions, the processor may perform steps and/or processes corresponding to the first terminal device in the foregoing method embodiments.

It should be understood that, in this embodiment of this application, the one or more processors 1002 each may be a central processing unit (central processing unit, CPU); alternatively, the one or more processors 1002 each may be another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor.

A person of ordinary skill in the art may be aware that units and algorithm steps in examples described with reference to embodiments disclosed in this specification can be implemented as electronic hardware or a combination of computer software and electronic hardware. Whether these functions are implemented by using hardware or software depends on specific application of the technical solution and design constraints. A person skilled in the art may use different methods to implement the described functions for each particular application, but it should not be considered that the implementation goes beyond the scope of this application.

A person skilled in the art can clearly understand that, for convenience and brevity of description, reference may be made to corresponding processes in the method embodiments for specific operating processes of the foregoing system, apparatus, and unit. Details are not described herein again.

In several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and components displayed as units may or may not be physical units, that is, may be located in one place, or may be distributed on a plurality of network units. Some or all of the units may be selected based on an actual requirement, to achieve the objectives of the solutions in embodiments.

In addition, the functional units in embodiments of this application may be integrated into one processing unit, each unit may exist alone physically, or two or more units may be integrated into one unit.

If the function is implemented in the form of a software functional unit and sold or used as an independent product, the function may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any person skilled in the art can easily conceive modifications or replacements within the technical scope of this application, and these modifications or replacements shall fall within the protection scope of this application. Therefore, the protection scope of this application shall be subject to the protection scope of the claims.

What is claimed is:

1. A method for monitoring a link, applied to a first terminal device, wherein the method comprises:
   establishing a Bluetooth asynchronous connectionless link (ACL) with a second terminal device, wherein the first terminal device is a slave and the second terminal device is a master, and the first terminal device has established a wireless fidelity (Wi-Fi) link;
   determining a preset parameter of the first terminal device and/or the second terminal device;
   determining, based on the preset parameter, whether to perform a role switch;
   sending a first request message to the second terminal device when it is determined to perform the role switch, wherein the first request message is used to request role switch between the first terminal device and the second terminal device, and a Bluetooth time-sharing ratio of the master per unit time is lower than that of the slave per unit time;
   receiving, by the first terminal device, a first response message from the second terminal device, wherein the first response message is used to confirm or reject the role switch with the first terminal device; and
   when it is determined to perform the role switch, monitoring the Bluetooth ACL based on a first Bluetooth time-sharing ratio, wherein the first Bluetooth time-sharing ratio is lower than a second Bluetooth time-sharing ratio used by the first terminal device to monitor the Bluetooth ACL before the role switch.

2. The method according to claim 1, wherein the preset parameter comprises at least one of the following:
   Wi-Fi data transmission flow and/or Bluetooth data transmission flow of the first terminal device; or
   a power consumption increment of the first terminal device acting as a master; or
   a power capacity of the first terminal device; or
   a power capacity of the second terminal device; or
   a capability of the second terminal device acting as a slave; or
   a performance reduction of the second terminal device acting as a slave.

3. The method according to claim 2, wherein the determining, by the first terminal device based on the preset parameter, whether to perform the role switch comprises:
   determining whether the second terminal device has the capability to act as a slave, whether the power capacity of the second terminal device is greater than or equal to a first preset threshold, and whether the performance reduction of the second terminal device acting as a slave is less than or equal to a second preset threshold when at least one of the following conditions is met:
   the Wi-Fi data transmission flow and/or Bluetooth data transmission flow of the first terminal device is higher than or equal to a third preset threshold;
   the power consumption increment of the first terminal device acting as a slave is greater than or equal to a fourth preset threshold; or
   the power capacity of the first terminal device is less than or equal to a fifth preset threshold; and
   determining to perform the role switch when the second terminal device has the capability to act as a slave, the power capacity of the second terminal device is greater than or equal to the first preset threshold, and the performance reduction of the second terminal device acting as a slave is less than or equal to the second preset threshold.

4. The method according to claim 3, wherein the first request message comprises a first time point; and
   the monitoring the Bluetooth ACL based on a first Bluetooth time-sharing ratio comprises:
   monitoring the Bluetooth ACL based on the first Bluetooth time-sharing ratio at the first time point.

5. The method according to claim 3, wherein the first response message comprises a second time point, and the second time point is determined by the second terminal device; and the monitoring the Bluetooth ACL based on a first Bluetooth time-sharing ratio comprises:
monitoring the Bluetooth ACL based on the first Bluetooth time-sharing ratio at the second time point.

6. The method according to claim 2, wherein the determining, by the first terminal device based on the preset parameter, whether to perform the role switch comprises:
determining, by the first terminal device, not to perform the role switch when the following conditions are met:
the Wi-Fi data transmission flow and/or Bluetooth data transmission flow of the first terminal device is lower than or equal to the third preset threshold;
the power consumption increment of the first terminal device acting as a slave is less than or equal to the fourth preset threshold; and
the power capacity of the first terminal device is greater than or equal to the fifth preset threshold.

7. The method according to claim 2, wherein the determining, by the first terminal device based on the preset parameter, whether to perform the role switch comprises:
determining, by the first terminal device, not to perform the role switch when at least one of the following conditions is met:
the second terminal device does not have the capability to act as a slave;
the power capacity of the second terminal device is less than or equal to the first preset threshold; or
the performance reduction of the second terminal device acting as a slave is greater than or equal to the second preset threshold.

8. The method according to claim 1, wherein the determining a preset parameter of the first terminal device and/or the second terminal device comprises:
obtaining historical switch information of the first terminal device and the second terminal device; and
determining a preset parameter of the first terminal device and/or the second terminal device from the historical switch information.

9. The method according to claim 8, wherein before the determining, based on the preset parameter, whether to perform the role switch, the method further comprises:
determining whether the first terminal device is in a Wi-Fi and Bluetooth coexistence scenario; and
the determining, based on the preset parameter, whether to perform the role switch comprises:
when the first terminal device is in a Wi-Fi and Bluetooth coexistence scenario, determining, based on the preset parameter, whether to perform role switch.

10. The method according to claim 9, wherein the establishing a Bluetooth ACL between the first terminal device and the second terminal device comprises:
receiving a Bluetooth ACL establishment request message from the second terminal device; and
sending a Bluetooth ACL establishment response message to the second terminal device based on the Bluetooth ACL establishment request message, wherein the Bluetooth ACL establishment response message is used to confirm the establishment of the Bluetooth ACL with the second terminal device.

11. A terminal device, comprising a processor, wherein the processor is coupled to a memory, the memory is configured to store a computer program, and when the processor invokes the computer program, the terminal device is enabled to perform the method according to claim 1.

12. A computer-readable storage medium, wherein the computer-readable storage medium is configured to store a computer program, and when the computer program is run on a terminal device, the terminal device is enabled to perform the method according to claim 1.

* * * * *